(12) United States Patent
Peng et al.

(10) Patent No.: US 8,953,421 B2
(45) Date of Patent: Feb. 10, 2015

(54) SUBMOUNT LAYERS CONFIGURED TO ENHANCE ABSORPTION OF LIGHT PROXIMATE A BONDING FEATURE

(71) Applicant: Seagate Technology LLC, Cupertino, CA (US)

(72) Inventors: Chubing Peng, Eden Prairie, MN (US); Michael Allen Seigler, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/930,350

(22) Filed: Jun. 28, 2013

(65) Prior Publication Data
US 2015/0003220 A1    Jan. 1, 2015

(51) Int. Cl.
  *G11B 11/00* (2006.01)
  *G11B 13/04* (2006.01)
(52) U.S. Cl.
  CPC ...................................... *G11B 13/04* (2013.01)
  USPC ................... 369/13.32; 369/13.24; 369/13.38
(58) Field of Classification Search
  None
  See application file for complete search history.

(56) References Cited

U.S. PATENT DOCUMENTS

| | | | |
|---|---|---|---|
| 7,921,436 B2 | 4/2011 | Shimizu et al. | |
| 8,179,745 B2 | 5/2012 | Nakamura et al. | |
| 8,270,262 B2 | 9/2012 | Naniwa et al. | |
| 8,300,503 B2 | 10/2012 | Arai et al. | |
| 2011/0090587 A1* | 4/2011 | Chou et al. | 360/59 |
| 2011/0096435 A1* | 4/2011 | Sasaki et al. | 360/114.01 |
| 2011/0228653 A1* | 9/2011 | Shimazawa et al. | 369/13.32 |
| 2012/0320719 A1 | 12/2012 | Arai et al. | |
| 2012/0327754 A1 | 12/2012 | Olson | |

FOREIGN PATENT DOCUMENTS

JP    2013004148    1/2013

* cited by examiner

*Primary Examiner* — Muhammad N Edun
(74) *Attorney, Agent, or Firm* — Hollingsworth Davis, LLC

(57) ABSTRACT

An apparatus includes a submount having a mounting surface and a top surface opposite the mounting surface. A slider has a bonding feature that interfaces with the mounting surface of the submount, and two or more layers are disposed between the mounting surface of the submount and the bonding feature. The two or more layers are configured to enhance light absorption of light in proximity to the bonding feature. The light originates from a source of electromagnetic energy that illuminates the top surface of the submount.

20 Claims, 11 Drawing Sheets

# SUBMOUNT LAYERS CONFIGURED TO ENHANCE ABSORPTION OF LIGHT PROXIMATE A BONDING FEATURE

SUMMARY

The present disclosure relates to apparatuses and methods usable for attaching optical components using a source of electromagnetic energy. In one aspect, the apparatus includes a submount having a mountable surface and a top surface opposite the mounting surface. A slider having a bonding feature interfaces with the mounting surface of the submount. The provided apparatus includes two or more layers disposed between the mounting surface of the submount and the bonding feature. The two or more layers are configured to enhance absorption of light in proximity to the bonding feature, the light originating from a source of electromagnetic energy that illuminates the top surface of the submount.

A method of attaching a laser diode submount to a slider involves providing an apparatus that includes a submount having a mounting surface and a top surface opposite the mounting surface, a slider having a bonding feature that interfaces with the mounting surface of the submount, and two or more layers disposed between the mounting surface of the submount and the bonding feature, the layers configured to enhance absorption of electromagnetic energy in proximity to the bonding feature. The source of electromagnetic energy can originate from a light source that can include an optical fiber laser that illuminates the top surface of the submount. The submount further comprises a laser diode and the slider further comprises an optical waveguide. The provided method also includes positioning the submount and the slider so that light emanating from the laser diode on the submount is optically coupled to the waveguide in the slider, directing electromagnetic radiation from an optical fiber laser through the top surface of the submount to the two or more layers configured to enhance the absorption of light at in proximity to the bonding feature of the slider, and bonding at least one of the two or more layers to the bonding feature of the slider.

In the present disclosure:

"lossy material" refers at least to materials that can dissipate electromagnetic energy passing through it; and "optical fiber laser" refers at least to an optical fiber configured to direct output light from a laser diode to another optical component.

The provided apparatus and method can reduce optical fiber bonding light absorption in the submount or the slider which can be a problem for aligning a laser diode attached to the submount to an optical waveguide in the slider used for HAMR recording. The use of the provided apparatus and method avoids the heating of large thermal masses of the submount, the slider, or both that can slow resolidification of the bonding layer and increase the possibility of relative movement during the resolidification, due to differing thermal expansion of the materials involved.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
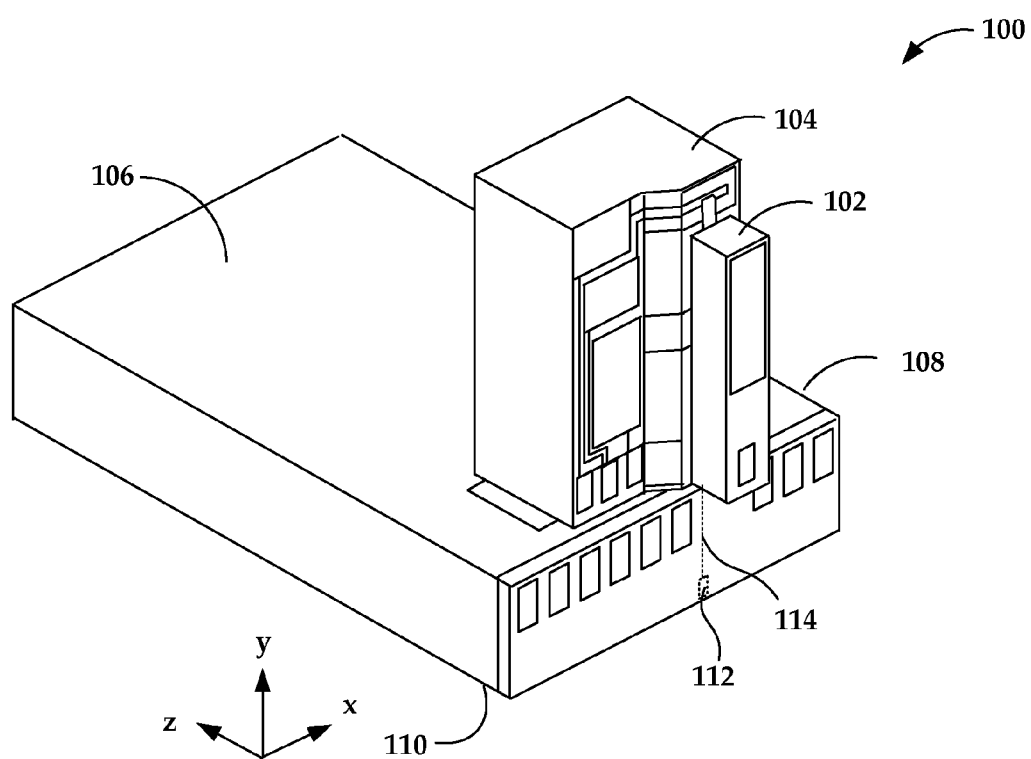
FIG. 1 is an isometric view of an embodiment of a heat-assisted, magnetic recording, hard drive slider assembly.

In the following description, reference is made to the accompanying set of drawings that form a part of the description hereof and in which are shown by way of illustration several specific embodiments. It is to be understood that other embodiments are contemplated and can be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The present disclosure generally relates to magnetic recording devices used for data storage. Apparatuses and methods are described herein below that can facilitate assembly of very small scale optical devices. These apparatuses and methods can be used, for example, for assembling heat-assisted magnetic recording (HAMR) devices, which can also be described as thermal-assisted magnetic recording (TAMR) and energy-assisted magnetic recording (EAMR). Generally, a HAMR device uses a laser diode or other energy source to heat a magnetic medium while it is being recording.

A HAMR data storage medium has a high magnetic coercivity that is able to overcome superparamagnetic effects (e.g., thermally-induced, random, changes in magnetic orientations) that currently limit the areal data density of conventional hard drive media. In a HAMR device, a small portion, or "hot spot", of the magnetic medium is locally heated to its Curie temperature, thereby allowing magnetic orientation of the medium to be changed at the hot spot while being written to by a transducer (e.g., magnetic write pole).

A HAMR read/write head, sometimes referred to as a slider, includes magnetic read and write transducers similar to those on current hard drives. For example, data can be read by a magneto-resistive sensor that detects magnetic fluctuations of the moving medium. Data can be written to the magnetic medium by a write coil that is magnetically coupled to a write pole. A HAMR slider can also include a source of energy, such as a laser diode, and an optical delivery path through the slider that delivers the energy to the surface of the medium. In some configurations, the laser diode can be a separately-manufactured device that is attached to the slider.

During the attachment procedure, it is desirable to precisely align the laser diode to the slider during assembly to minimize optical transmission losses in the optical delivery path. This alignment can be challenging due to, among other things, the small size of the laser diode and slider, which have can have dimensions on the order of 500 μm.

In reference now to FIG. 1, a perspective view shows HAMR slider assembly 100 according to an example embodiment. In this example, laser diode 102 is mounted to submount 104, and submount 104 is coupled to top surface 106 of slider body 108. Laser diode 102 in this example is an edge-emitting laser that emits light in the negative y-direction. Submount 104 can orient the laser output in a desired direction allowing it to be directly coupled to optical waveguide 114 within slider body 108. Optical waveguide 114 directs the laser output energy so that it is emitted from media-facing, air bearing surface 110 of slider body 108, thereby heating a proximate magnetic medium (not shown) that moves underneath slider assembly 100.

Media-facing surface 110 can be configured as an air-bearing surface (ABS) that maintains a cushion of air between slider body 108 and the recording medium. Transducer region 112 of slider body 108 includes at least a write transducer that generates a magnetic field and an optical transducer that receives energy from laser diode 102 and directs the energy to the recording medium. The optical transducer can include a near-field transducer (NFT) that directs the energy via surface plasmon resonance. Optical waveguide 114 includes optical components (e.g., waveguides, mirrors, couplers, decouplers, etc.) that are integrated in slider body 108 and facilitate delivering energy from laser 102 to transducer region 112.

In the illustrated slider assembly 100, laser diode 102, submount 104 and slider body 108 are formed separately using integrated circuit/optics manufacturing techniques known in the art. For example, the components can be formed by (among other things) depositing layers of material on a wafer substrate, creating features in the layers using photolithography, chemical/mechanical polishing, and dividing the wafer into individual components. Afterwards, laser diode 102 can be bonded (e.g., soldered) to submount 104 and submount 104 can then be bonded to slider body 108. This can occur in another order, e.g., submount 104 can be bonded to slider body 108 before laser diode 102 is attached. In either case, it is desirable to precisely align the output of laser diode 102 with the optical coupling path 114 to minimize optical losses.

For purposes of the following discussion, optical components such as laser diode 102, submount 104, and slider body 106 can be referred to as a base component and/or an attachable component. In some embodiments, the base component can be larger than the attachable component, but not necessarily so. Generally, a mounting surface of the attachable component, for example, a submount can be aligned with a mounting surface of the base component, for example, a slider. An exposed surface of the attachable component (e.g., surface opposed to the mounting surfaces) can then be subjected to laser light from a bonding laser source, typically via an optical fiber. The light from the bonding laser source can travel through the attachable component to a bonding feature on the mounting surface of the base component. The bonding feature can include a solder pad, bond line, bond layer, etc.

Figure 2:
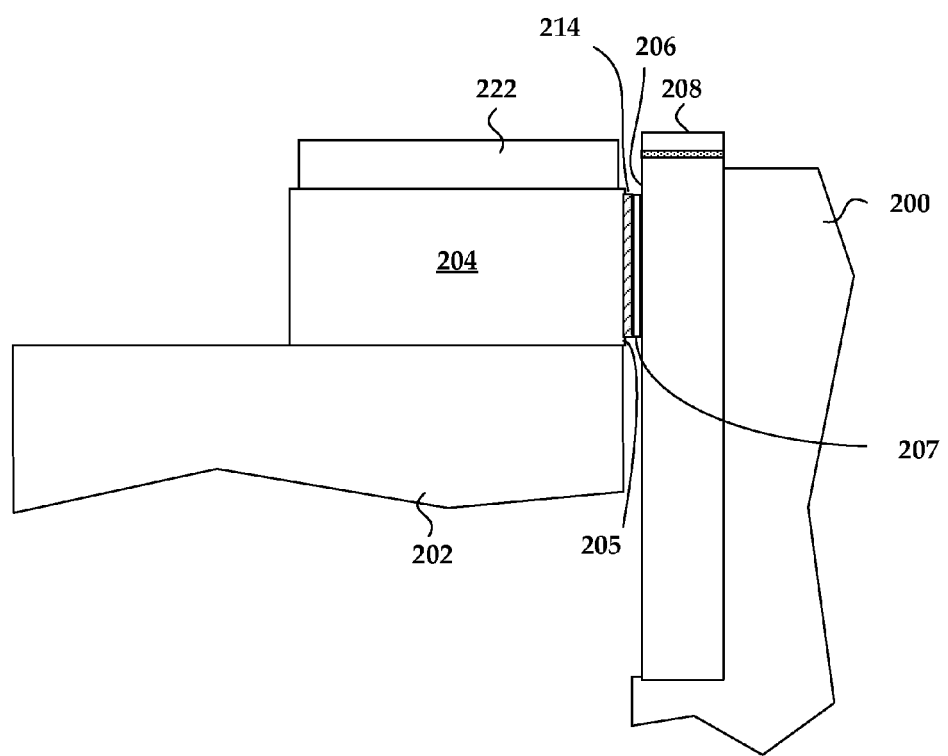
FIG. 2 is a block diagram illustrating an embodiment of a provided apparatus.

FIG. 2 is a block diagram illustrating an apparatus according to an example embodiment. For purposes of this discussion, the previously described submount 104 (204 in FIG. 2) will be configured as the attachable component, and the previously described slider body 108 (208 in FIG. 2) will be configured as the base component. The slider body 208 is held by fixture 200, e.g., slider chuck tooling. Similarly, fixture 202 (e.g., submount chuck tooling) holds submount 204 with already-attached laser diode 222. Fixtures 200 and 202 are arranged so that mounting surface 205 of submount 204 faces bonding region 206 of slider body 208. Bonding region 206 includes bonding feature 207, such as solder or adhesive. Two or more layers (shown in FIG. 2 as feature 214) are disposed between mounting surface 205 of submount 204 and bonding feature 207 of bonding region 206. In some embodiments, SnAg solder can be used as the bonding feature between submount 204 and slider 208. Laser diode 222 is also bonding to the side of submount 204 using a SnAg solder. The solder composition used to bond the laser diode to the side of the submount is may be different (e.g., higher melting temperature) than the solder used to bond the submount to the slider.

Feature 214 includes two or more layers that absorb energy from an external bonding light. A bonding light source of low divergence in angular spectrum, for example, an optical fiber laser of low numerical aperture, illuminates the submount (see 320A or 320B in FIGS. 3A-B) and provides a heat source for the bonding submount 204 to slider 208. For example, such optical fiber bonding lasers have operated at a wavelength of 976 μnm. At this wavelength, the light propagation distance at $1/e^2$ intensity in the silicon submount is only about 259 μm. Since the length of submount 204 is greater than the length of laser diode 222 and laser diodes may be greater than about 350 μm in length, most of the light at 976 μnm is absorbed at the top surface of the silicon submount. The methods and apparatuses described herein may be configured so that the bonding light has a wavelength of greater than about 1.2 μm where silicon is almost transparent. For example, at a wavelength of 1.1 μm only 12% of light is absorbed by a silicon submount having a length of 400 μm.

Figure 3A:
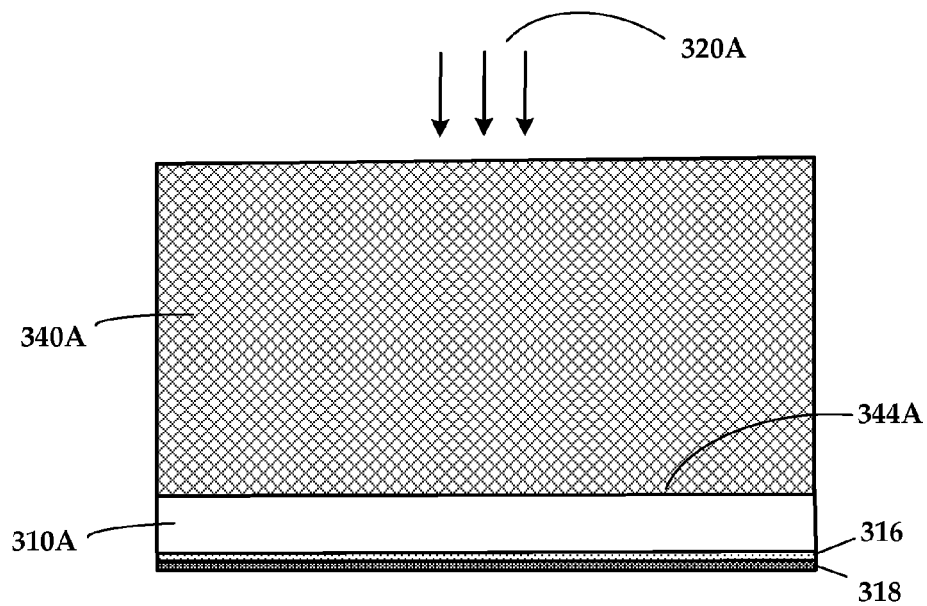
FIGS. 3A and 3B are side view block diagrams of two embodiments of a provided submount of a provided apparatus having two or more layers disposed between the mounting surface of the submount and the bonding feature.
Figure 3B:
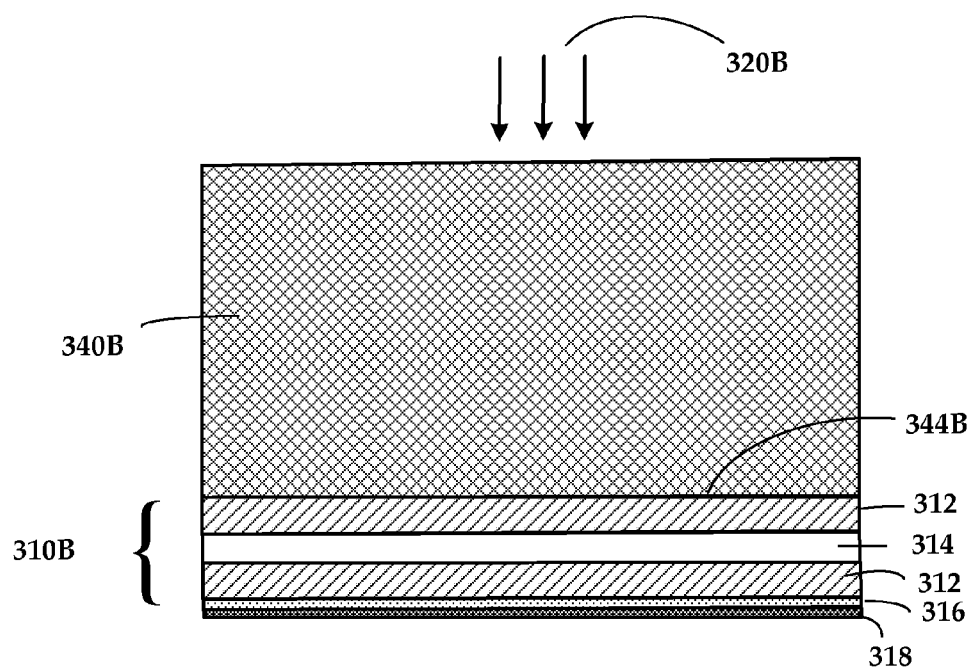

FIGS. 3A and 3B are side view block diagrams of two embodiments of a submount having two or more layers disposed between the mounting surface of the submount and the bonding feature. FIG. 3A is a block diagram that includes submount 340A. The embodied submount comprises silicon which is transparent to electromagnetic energy 320A emanating from a bonding laser (not shown) when the wavelength of the bonding laser light is greater than about 1.2 μm. Submount 340A has light absorbing layer 310A disposed upon mounting surface 344A. Adhesion enhancing layer 316, such as platinum or titanium, is disposed upon light absorbing layer 310A on the side opposite mounting surface 344A as shown in FIG. 3A.

Metal reflective layer 318 is disposed on adhesion enhancing layer 316 and may be formed of a good heat conductor such as gold. Metal reflective layer 318 reflects optical fiber laser light 320A back into light absorbing layer 310A to allow most of the energy to go into light absorbing layer 310A enhancing light absorption for bonding of submount 340A to a slider (not shown). When submount 340A is bonded to a slider (not shown in FIG. 3A but shown in FIG. 2) metal reflective layer 318 will bond to solder disposed upon the bonding region of the slider body. With a localized heat source (layer 310A) near the solder, the total thermal mass for bonding is reduced and the time for solder solidification is shortened, reducing the possibility of relative movement between the submount and the slider during bonding. Relative movement between the submount and the slider during bonding can cause alignment problems of a laser diode attached to the submount with the waveguide in the slider which can, in turn, affect performance of the laser-on-slider apparatus.

In some embodiments, the top surface of submounts 340A and/or 340B may include an antireflection coating (not shown in the drawings) when the submounts are made of silicon. Silicon reflects about 30% of light at 1.2 μm if the light is incident from air. For a single layer antireflection coating the refractive index of the layer will be the square root of the submount refractive index if the thickness is quarter wavelength. Useful materials for antireflection coatings include yttrium oxide and tantalum oxide for silicon submounts.

During bonding, the heat generated from light absorption in the submount and/or coating can diffuse to the air-bearing surface of the slider to melt the solder for bonding. If light can propagate through the submount without absorption, the heat created by this high absorption layer (for example, heat absorption layers 310A or 310B) can be localized to the bonding layer (not shown in FIG. 3A or 3B, but shown as 207 in FIG. 2). High absorption layers 310A and 310B can be a poor thermally conductive layer and can be located between submount 340A or 340B and a top lossy metal 310 in FIGS. 3A and 3B. In some embodiments, the high absorption layers can be located below metal reflective layer 318 but above the bonding layer rather than on top as shown in FIGS. 3A-B. Use of the provided high absorption layer that include two or more layers disposed between the mounting surface of the submount and the bonding feature as disclosed below, can help keep light absorption in the submount and/or the slider thus making solder heating more efficient. When the submount or the slider heat up, due to the large thermal mass of the submount and slider, the bonding layer can be prevented from rapidly resolidifying which can cause the submount and the slider to become misaligned.

In one embodiment, the heat absorption layer can have a low thermal mass that can allow for good heat transfer during operation of the laser diode attached to the submount but can keep the submount from getting hot during the resolidification process of the bonding layer. In another embodiment, a material that has a thermal conductivity that is a function of temperature can be used as the heat absorption layer. The thermal conductivity of the material can either increase or decrease with increasing temperature. For example, if the normal operating temperature of the apparatus when used in a HAMR device is 100° C., and the solder resolidification temperature is 300° C., a material that decreases its thermal conductivity significantly between 100° C. and 300° C. could be utilized. Such materials can be, but are not limited to metals such as gold, aluminum, platinum, tungsten or copper.

In the embodiment shown in FIG. 3A, light absorbing layer 310A is a composite that includes at least one semiconductor and one lossy material. Semiconductors often have a high index of refraction (n=4.34 for germanium) but a low absorption coefficient (k=0.087 for germanium) at a wavelength of about 1.2 μm. Lossy materials, such as titanium have a high index of refraction (n=3.62 for titanium) and an absorption coefficient that is also high (k=3.5) at 1.2 μm. Light absorbing layer 310A is a composite of germanium and titanium but could be a composite of any mixtures of at least one semiconductor and one lossy material that has a high permittivity. Examples of useful semiconductors include Si, Ga-based alloys (GaAs, GaAsSb), Ge-based alloy (Ge, GeSi), and In-based alloys (InP, InGaAs, and InSb). Examples of other useful lossy materials include W, Ta, Ti, Pt, Ru, Zr, Cr, Rh, and Mo.

FIG. 3B is a block diagram that includes submount 340B. The embodied submount comprises silicon which is transparent to electromagnetic energy 320B emanating from an optical fiber attached to a bonding laser (not shown) when the wavelength of the bonding laser light is greater than about 1.2 μm. The optical fiber laser may emit a wavelength of from about 1.20 μm to about 1.55 μm. Submount 340B has light absorbing layer 310B disposed upon mounting surface 344B. Adhesion enhancing layer 316, such as platinum or titanium, is disposed upon light absorbing layer 310B on the side opposite mounting surface 344B as shown in FIG. 3B.

Metal reflective layer 318 is disposed on adhesion enhancing layer 316 and may be formed of a good heat conductor such as gold. Metal reflective layer 318 reflects energy from laser bonding light 320B back into light absorbing layer 310B to allow most of the energy to go into light absorbing layer 310B enhancing light absorption for bonding of submount 340B to a slider (not shown). When submount 340B is bonded to a slider (not shown in FIG. 3B but shown in FIG. 2) metal reflective layer 318 will bond to solder disposed upon the bonding region of the slider body. With a localized heat source (layer 310B) near the solder, the total thermal mass for bonding is reduced and the time for solder solidification is shortened, reducing the possibility of relative movement between the submount and the slider during bonding. The combination of adhesion enhancing layer 316 (such as platinum or titanium) and metal reflective layer 318 (e.g., noble metals such as gold) can reflect the energy from laser bonding into the light absorption layer. Relative movement between the submount and the slider during bonding can cause alignment problems of a laser diode attached to the submount with the waveguide in the slider which can, in turn, affect performance of the laser-on-slider apparatus.

In the embodiment shown in FIG. 3B, light absorbing layer 310B is a tri-layer that includes two layers of lossy material such as titanium 312 surrounded by a layer of semiconductor material such as germanium 314. In one embodiment, light absorbing layer 310B can be a tri-layer structure that includes a 15 nm layer of titanium, a 47 nm layer of germanium, and a 15 nm layer of titanium backed up by layers 316 and 318 as shown in FIG. 3B. If the mole fraction of germanium is 0.61, the effective permittivity is 3.7+i 1.4. Analytical calculation yields a reflectivity of only 0.00012. If germanium is replaced by silicon, the reflectivity is also very low (0.00695) when the silicon layer is 65 nm thick.

Adhesion enhancing layer 316 and metal reflective layer 318 may be formed of platinum (or titanium) and gold respectively. Nobel metals can also work as the metal reflecting layer. Gold has high reflection at wavelengths of about 1.2 μm and does not absorb very much energy at that wavelength. To have high absorption at this wavelength, light absorbing layer 310A or layers 310B need to nearly match the impedance of the silicon submount material 340A or 340B. High reflection from the platinum and gold layers will enhance absorption in the light absorbing layers if the thickness and refractive index are properly chosen.

It will be understood that the light absorbing layers 310A and/or 310B, adhesion enhancing layers 316, and/or metal reflective layers 318 shown in FIGS. 3A and 3B may be integrated with submounts 340A and 340B. In other embodiments, some or all of these layers may instead be provided on a surface of a mating component, e.g., a slider surface that interfaces with the submounts 340A, 340B.

Figure 4A:
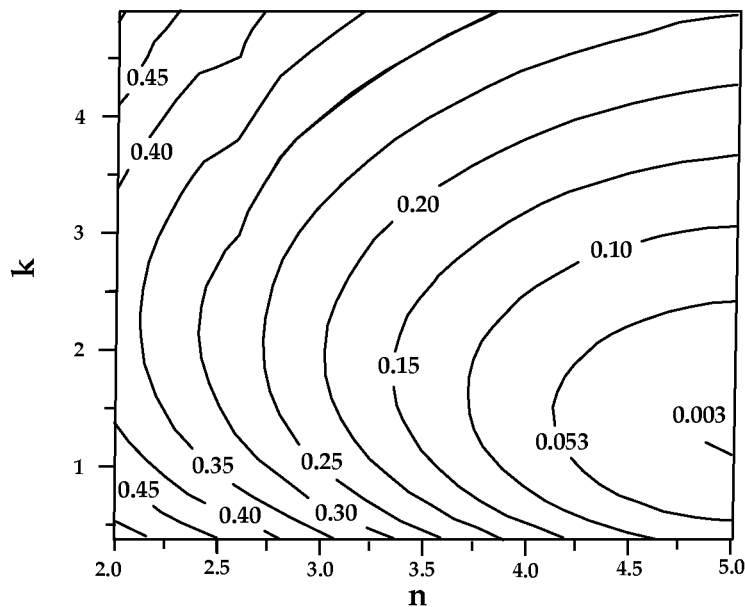
FIGS. 4A and 4B are modeled graphs of reflectivity as a function of refractive index and absorption coefficient for embodiments of provided layers on the mounting surface of a provided submount having thicknesses of 50 nm and 100 nm respectively.
Figure 4B:
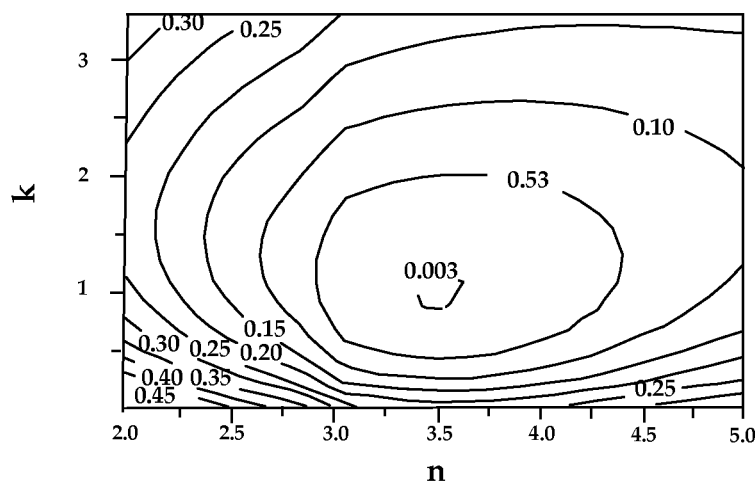

FIGS. 4A and 4B are modeled graphs of reflectivity as a function of refractive index and absorption coefficient for embodiments of provided layers on the mounting surface of a provided submount having thicknesses of 50 nm ($\lambda/24$) and 100 nm ($\lambda/12$) respectively. The models used light of 1.2 μm wavelength, 200 nm of platinum, 50 nm gold and complex refractive indices of 4.1+i 6.5 for platinum, 0.35+i 8.472 for gold and 3.5193 for silicon. FIGS. 4A and 4B show the reflectivity modeled with these parameters. At both thicknesses the optimal absorption coefficient for perfect absorption is about 1.2 and the optical refractive index depends upon layer thickness which is about 5 for $\lambda/24$ (FIG. 4A) and 3.6 for $\lambda/12$ (FIG. 4B).

Figure 5:
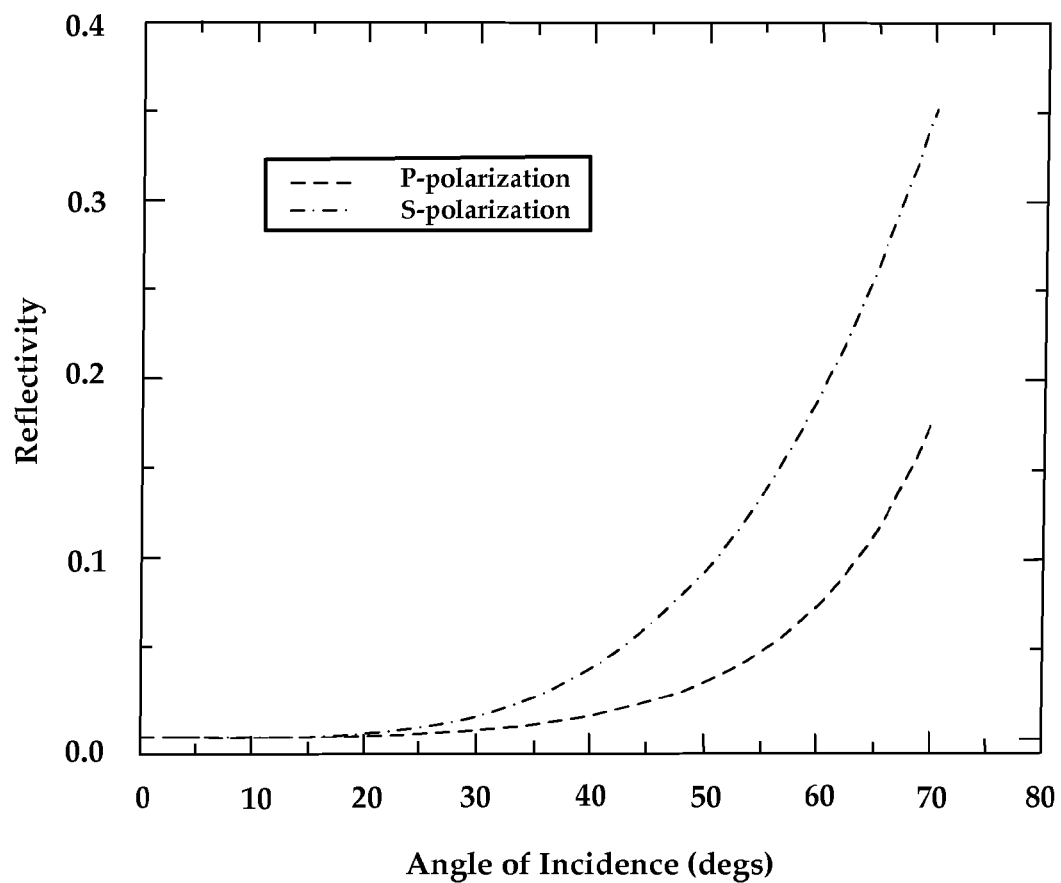
FIG. 5 is a modeled graph of reflectivity as a function of incident angle at a light wavelength of 1.2 μm using the tri-layer structure of FIG. 3B.
Figure 6:
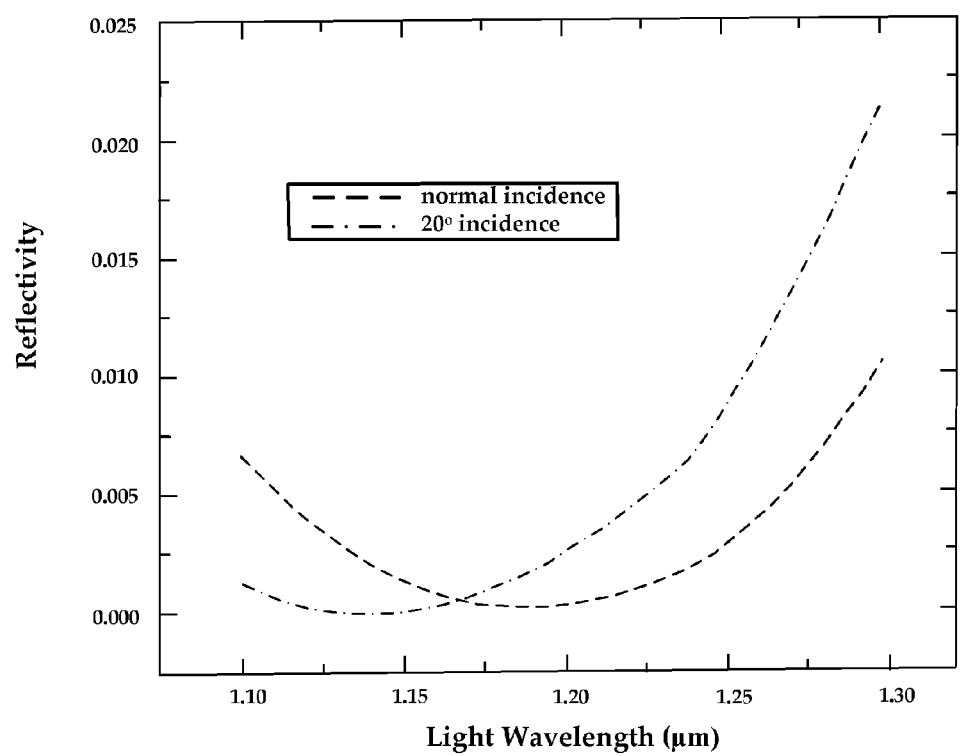
FIG. 6 is a modeled graph of reflectivity as a function of light wavelength at two angles of incidence using the tri-layer structure of FIG. 3B.

The provided light absorbing layer can have tolerance of both angle of incidence and wavelength of light from the optical fiber laser. FIG. 5 is a modeled graph of reflectivity as a function of incident angle at a light wavelength of 1.2 μm using the structure shown in FIG. 3B in which the light absorbing layer includes a tri-layer of 47 nm of germanium sandwiched between two 15 nm layers of titanium. FIG. 5 shows that there is low reflectivity of bonding laser light in the tri-layer up to an angle of incidence of 35 degrees or more from normal depending upon the polarization of the bonding laser light. FIG. 6 is a modeled graph of reflectivity as a function of light wavelength at two angles of incidence using the tri-layer structure of FIG. 3B. FIG. 6 shows very little change in reflectivity (reflectivity scale is highly magnified) over a large range of wavelengths from about 1.10 to greater than 1.30 μm or even higher depending upon angle of incidence.

Figure 7A:
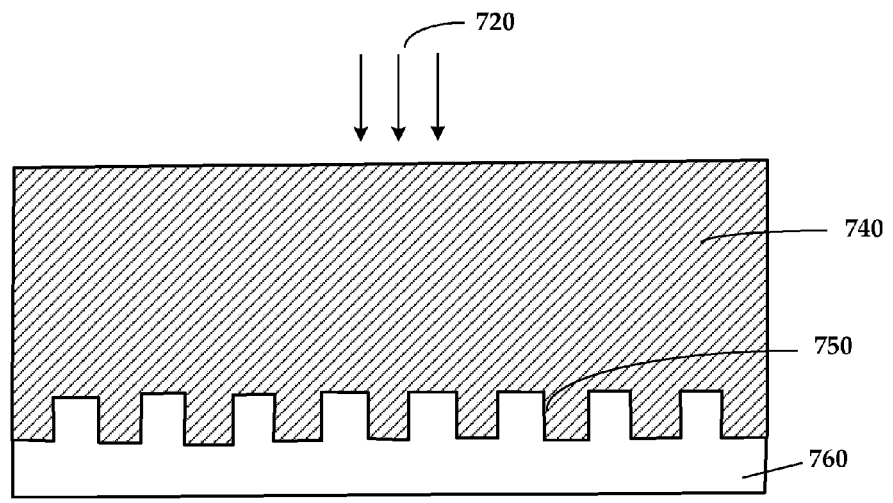
FIGS. 7A-C are a side view block diagram of several embodiments of submounts having surface plasmons propagating at lossless or lossy dielectrics of positive permittivity and metals of negative permittivity.
Figure 7B:
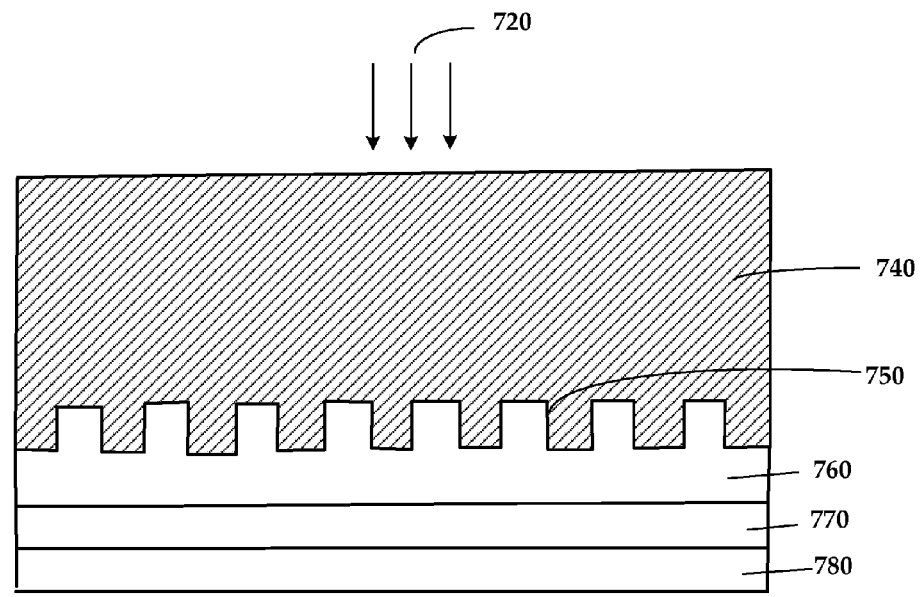
Figure 7C:
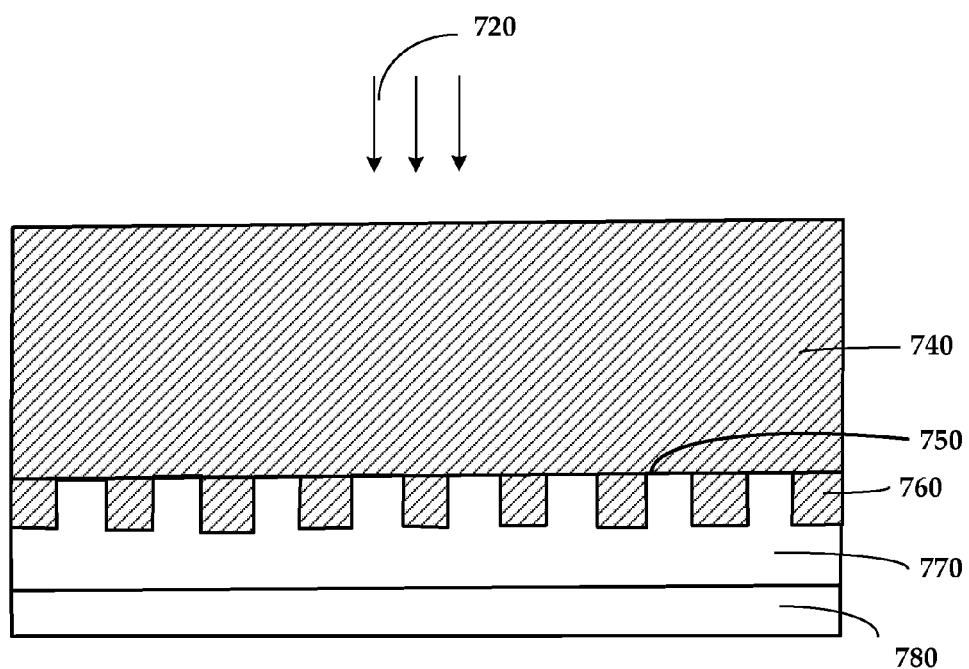

In another embodiment, the two or more layers disposed between the mounting surface and the bonding feature can include a diffraction grating and at least one plasmonic metal. Near perfect absorption can be obtained using a surface plasmon propagating at the interface between lossless or lossy dielectrics having positive permittivity and a metal layer having negative permittivity. Due to the mismatch in moment between a surface plasmon and a light line, a diffraction grating (one dimensional or two dimensional) can be fabricated at the mounting surface of the submount or at the plasmonic metal coating to excite the surface plasmon. FIGS. 7A-7C show some possible configurations.

FIG. 7A shows submount 740. Structured submount 740 has one-dimensional diffraction grating 750 disposed upon its mounting surface as shown. Plasmonic metal layer 760 is disposed upon structured submount 740, and an interface between the material (e.g., silicon) of the submount body and the plasmonic layer 760 forms the grating 750. Plasmonic metal layer 760 can include α-phase tantalum and noble metals (such as ruthenium, rhodium, palladium, silver, osmium, indium, gold, or platinum). If the depth of diffraction grating 750 is shallow enough the grating will have a sharp resonance versus angle of incident as well as versus the wavelength of the incident light 720. Deep gratings using a local surface plasmon can reduce these sensitivities. Both shallow and deep gratings, if one-dimensional, will be polarization-dependent—only the incident beam of TE polarization will produce good absorption. A two-dimensional grating, called a "cross grating" can produce less polarization-dependence. The grating period to excite a surface plasmon at the silicon/plasmonic metal interface will be sub-wavelength with a two-dimensional grating, however the fabrication of cross gratings can be costly.

Figure 8A:
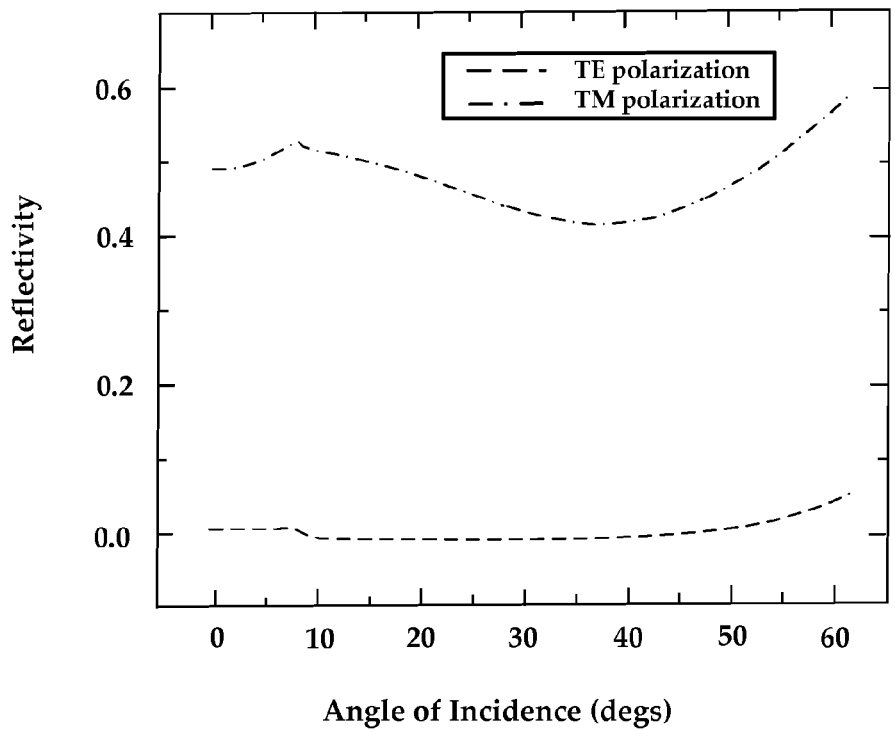
FIGS. 8A and 8B are graphs of reflectivity of the embodiment shown in FIG. 7A as a function of angle of incidence and wavelength respectively.
Figure 8B:
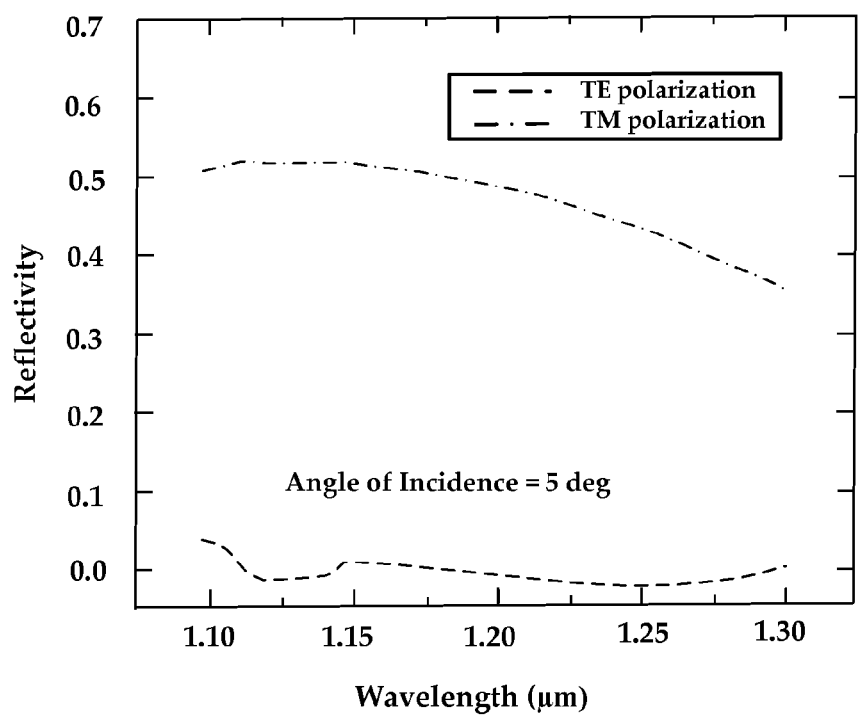

FIGS. 8A and 8B are graphs of reflectivity of the embodiment shown in FIG. 7A as a function of angle of incidence and wavelength respectively for one design of a deep grating. In this example (FIG. 7A) the silicon surface is patterned with a one-dimensional period of 300 nm and coated with an α-phase tantalum layer with the tantalum tooth width of 100 nm and a depth of 200 nm. As expected and shown in FIGS. 8A and 8B, the reflectivity is polarization dependent.

The embodiments shown in FIGS. 7B and 7C have a tri-layer metal-dielectric-metal structure. For the embodiment shown in FIG. 7B, incident light 720 travels through body of the submount 740 and impinges upon diffraction grating 750. Plasmonic metal layer 760 is disposed upon structured submount 740. Plasmonic metal layer 760 also functions as one metal that forms part of a highly absorbent tri-layer structure. The light absorbing tri-layer includes plasmonic metal layer 760, dielectric layer 770 (lossless or lossy), and optional reflective metal layer 780 (e.g., platinum, gold, or a combination thereof). The embodiment shown in FIG. 7C includes submount 740 having grating 750 disposed upon its mounting surface. The teeth of grating 750 are made of a plasmonic metal layer 760 as shown. An interface between the material (e.g., silicon) of the submount body, the plasmonic metal layer 760, and a dielectric layer (lossless or lossy) forms the grating 750. An optional metal reflective layer 780 completes the construction.

In another aspect a method of attaching a laser diode submount to a slider involves providing an apparatus that includes a submount having a mounting surface and a top surface opposite the mounting surface. A slider has a bonding feature that interfaces with the mounting surface of the submount, and two or more layers disposed between the mounting surface of the submount and the bonding feature. The layers are configured to enhance absorption of light in proximity to the bonding feature, the light originating from a fiber light source that illuminates the top surface of the submount. The submount may further include a laser diode and the slider may further include an optical waveguide. The method may also involve positioning the submount and the slider so that light emanating from the laser diode on the submount is optically coupled to the waveguide in the slider, directing electromagnetic radiation from an optical fiber laser through the top surface of the submount to the two or more layers configured to enhance the absorption of light at in proximity to the bonding feature of the slider, and bonding at least one of the two or more layers to the bonding feature of the slider.

Figure 9:
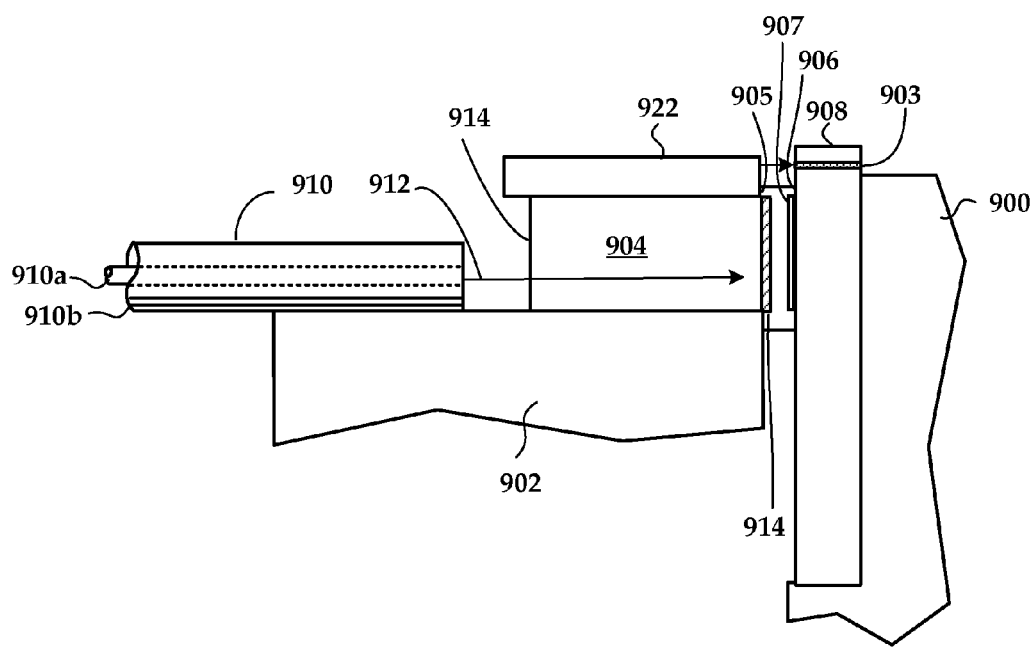
FIG. 9 is a block diagram illustrating an embodiment of a method for bonding an attachable component with a base component.

FIG. 9 is a block diagram illustrating an embodiment of a method for bonding an attachable component with a base component. For purposes of clarity in the diagram, mounting surface 905 or submount 904 is shown separated from bonding region 906. Submount 904 has laser diode 922 attached to one side. Submount 904 and slider 908 are positioned so that light emanating from laser diode 922 is optically coupled to waveguide 903 in slider 908 as shown by the arrow. Optical fiber laser 910 is positioned so that it directs electromagnetic radiation (arrow 912) through the top surface of submount 904 to the two or more layers 914 configured to enhance the absorption of light in proximity to bonding feature 907 of slider 908. Light 912 emanating from core 910a of optical fiber laser 910 is aligned so that, just before assembly, submount 904 is positioned with mounting surface 905 aligned with, but not yet in contact with, bonding region 906. In this example, the fixture 900 holding slider body 908 is moved in place for final assembly. After this positioning, the submount 904 is bonded to the slider body 908 via the application and subsequent removal of heat. For example, the bonding feature 907 (which can be located on the bonding region or mounting surface 905) can include one or more of solder pads, bond lines, bond layers, etc., that bond the submount 904 to the slider body 908 when heated to a predetermined temperature and then cooled.

One of the difficulties in maintaining optical alignment between the submount 904 and slider body 908 (or any similar optical components) is controlling thermal expansion of the surrounding materials when the bonding feature 907 is resolidified. If the heat is applied to the tooling assembly (e.g., in an oven), the fixture components 909 and 902 and other tooling components can undergo a thermal expansion. Even if externally applied heat is localized near the bonding region 906, enough stray energy (e.g., due to reflections, radiative heat transfer, etc.) can cause tooling expansion. The thermal expansion of the tooling can move the relative position of the slider body 908 and submount 904, which then reduces optimal optical alignment of the two components, e.g., an alignment of the output of the laser diode 922 with an optical pathway (waveguide 903) of the slider body 908.

To reduce thermal expansion of the tooling, the illustrated arrangement uses at least one cleaved optic fiber 910 that is positioned normal to an exposed surface 914 of submount 904, the exposed surface being opposed to mounting surface 905. A gap between a cleaved facet of optical fiber 910 and submount 904 is set to a clearance value that achieves optimal coupling efficiency. Optic fiber 910 includes a core 910a and cladding 910b. In one implementation, the core 910a is 100 µm in diameter, and the cladding 910b is 125 µm thick. The diameter of the core 910a is chosen not to extend beyond exposed surface 914 of the submount 904. The diameter of the core 910a can be significantly smaller (e.g., less than half) than outer dimensions of exposed surface 914 of submount 904. Various features of submount 904 and/or slider 908 homogenize the light transmitted to two or more layers 914 which results in even distribution of heat even when the energy originates from a small diameter core 210a.

Figure 10:
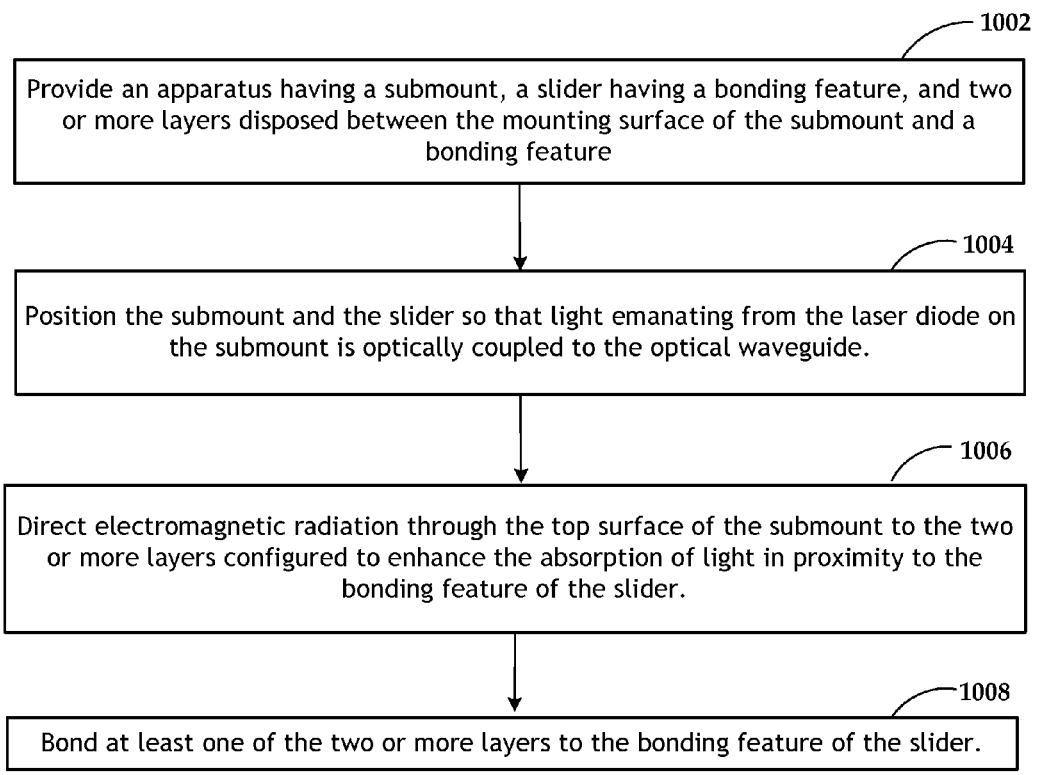
FIG. 10 is a flow chart illustrating an embodiment of a provided method.

FIG. 10 is a flow chart illustrating a method according to an example embodiment. The method involves providing 1002 an apparatus having a submount, a slider having a bonding feature, and two or more layers disposed between the mounting surface of the submount and a bonding feature. The submount may include a laser diode and the slider may include an optical waveguide. The method further involves positioning 1004 the submount and the slider so that light emanating from the laser diode on the submount is optically coupled to the optical waveguide. Then electromagnetic radiation is directed 1006 from an optical fiber laser through the top surface of the submount to the one or more layers configured to enhance absorption of light in proximity to the bonding feature of the slider. Finally, at least one of the two or more layers are bonded 1008 to the binding feature of the slider.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An apparatus comprising:
   a submount having a mounting surface and a top surface opposite the mounting surface;
   a slider having a bonding feature that interfaces with the mounting surface of the submount; and
   two or more layers disposed between the mounting surface of the submount and the bonding feature, the layers configured to enhance absorption of light in proximity to the bonding feature, the light originating from a source of electromagnetic energy that illuminates the top surface of the submount.

2. An apparatus according to claim 1, wherein the two or more layers are disposed on the mounting surface of the submount.

3. An apparatus according to claim 1, wherein the submount comprises silicon.

4. An apparatus according to claim 1, further comprising a laser mounted to a side surface of the submount and optically coupled to a waveguide on the slider.

5. An apparatus according to claim 1, wherein the bonding feature comprises a layer of SnAg solder.

6. An apparatus according to claim 1, wherein the two or more layers comprise a metal reflective layer proximate the bonding feature.

7. An apparatus according to claim 6, wherein the metal reflective layer comprises platinum, gold, or a combination thereof.

8. An apparatus according to claim 1, wherein the two or more layers comprise at least one semiconductor and at least one lossy material.

9. An apparatus according to claim 1, wherein the two or more layers comprise a composite that includes at least one semiconductor and at least one lossy material.

10. An apparatus according to claim 9, wherein the at least one semiconductor comprises germanium and the at least one lossy material comprises titanium.

11. An apparatus according to claim 1, wherein the two or more layers comprise a multilayer structure that includes alternating layers of at least two lossy materials and one semiconductor.

12. An apparatus according to claim 1, wherein the two or more layers comprise gold, aluminum, platinum, tungsten, or copper.

13. A method comprising:
    providing a submount having a mounting surface and a top surface opposite the mounting surface;
    providing a slider having a bonding feature that interfaces with the mounting surface of the submount, wherein two or more layers are disposed between the mounting surface of the submount and the bonding feature, the layers configured to enhance absorption of energy in proximity to the bonding feature;
    positioning the submount and the slider so that light emanating from a laser diode on the submount is optically coupled to an optical waveguide in the slider;
    directing electromagnetic radiation through the top surface of the submount to the two or more layers to bond the submount to the slider.

14. The method of claim 13, wherein the submount further comprises a plasmonic metal layer the two or more layers and a diffraction grating at an interface between a body of the submount and the plasmonic metal layer, wherein directing the electromagnetic radiation through the top surface of the submount further excites a surface plasmon at the plasmonic metal layer.

15. An apparatus comprising:
a slider having a bonding feature; and
a submount having a mounting surface that interfaces with the bonding feature and a top surface opposite the mounting surface, the submount comprising:
   a plasmonic metal layer proximate the mounting surface; and
   a diffraction grating at an interface between a body of the submount and the plasmonic metal layer, the diffraction grating and the plasmonic metal layer configured to enhance absorption of light in proximity to the bonding feature, the light originating from a source of electromagnetic energy that illuminates the top surface of the submount.

16. The apparatus of claim 15, further comprising a dielectric layer disposed between the plasmonic metal layer and the bonding feature.

17. The apparatus of claim 16, further comprising a reflective metal layer between the dielectric layer and the bonding feature.

18. The apparatus of claim 16, wherein the diffraction grating is formed by an interface between the body of the submount, the plasmonic metal layer, and the dielectric layer.

19. The apparatus of claim 15, wherein the plasmonic metal layer includes at least one of α-phase tantalum and a noble metal.

20. The apparatus of claim 15, wherein the diffraction grating comprises a one-dimensional grating.

* * * * *